No. 647,197. Patented Apr. 10, 1900.
H. W. PORTER.
COIN CONTROLLED APPARATUS FOR EXHIBITING PICTURES.
(Application filed Jan. 24, 1900.)
(No Model.) 3 Sheets—Sheet 1.
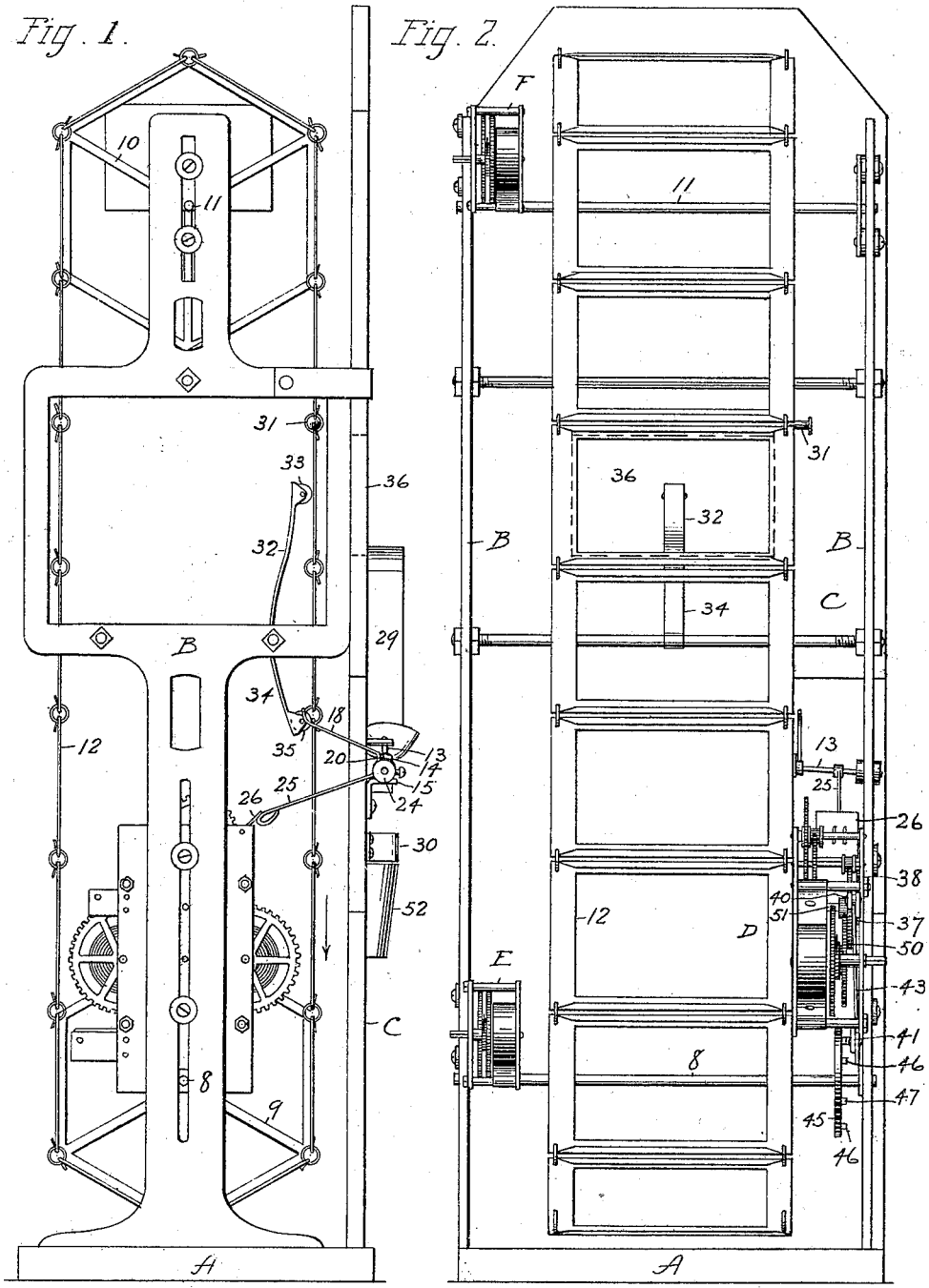
Witnesses
A. H. Stipek
B. C. Woodford
Inventor
Henry W. Porter
By James Shepard.
Atty.

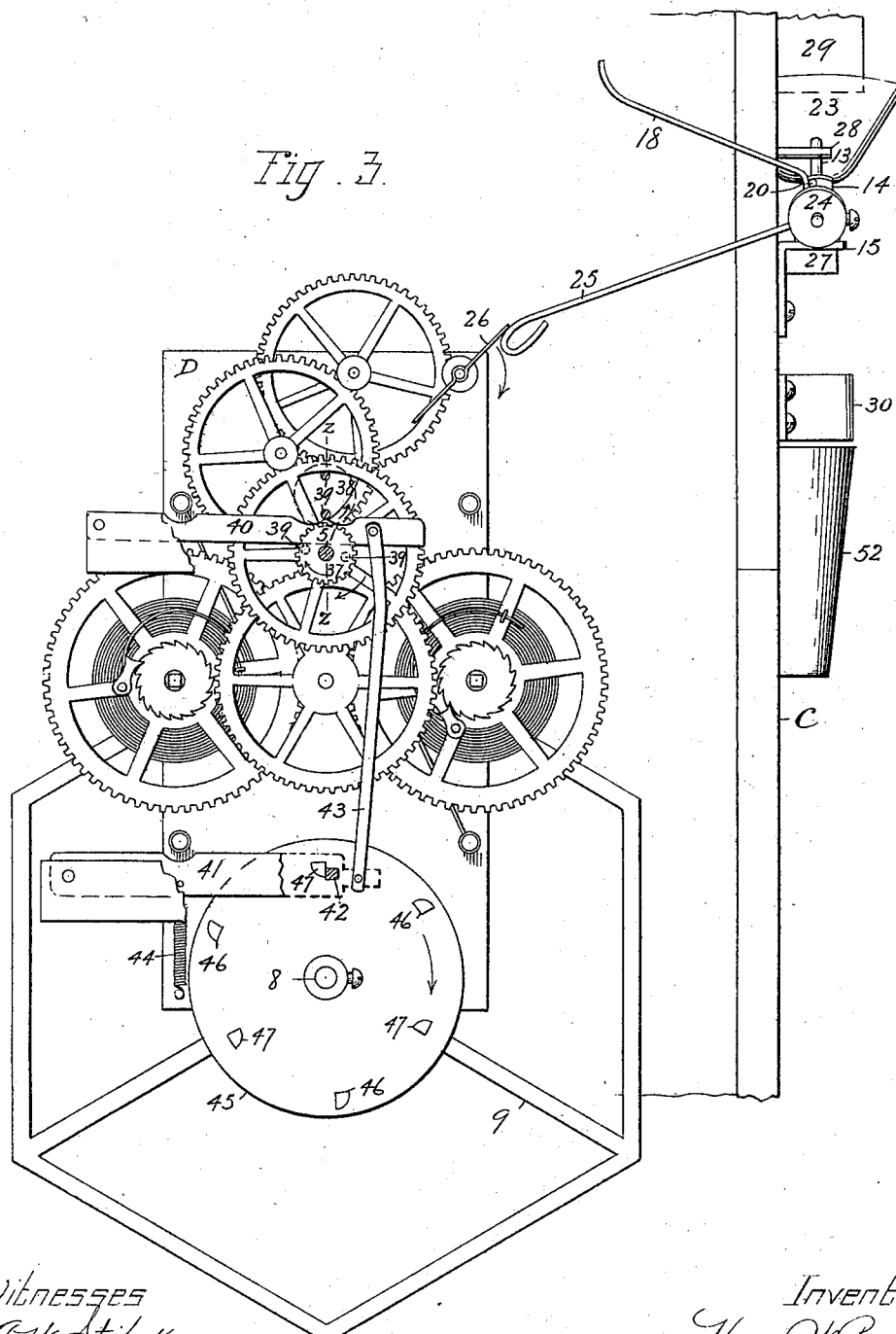

No. 647,197.  
Patented Apr. 10, 1900.  
H. W. PORTER.  
COIN CONTROLLED APPARATUS FOR EXHIBITING PICTURES.  
(Application filed Jan. 24, 1900.)  
(No Model.)  
3 Sheets—Sheet 3.
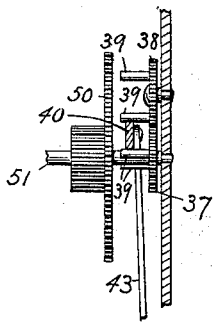
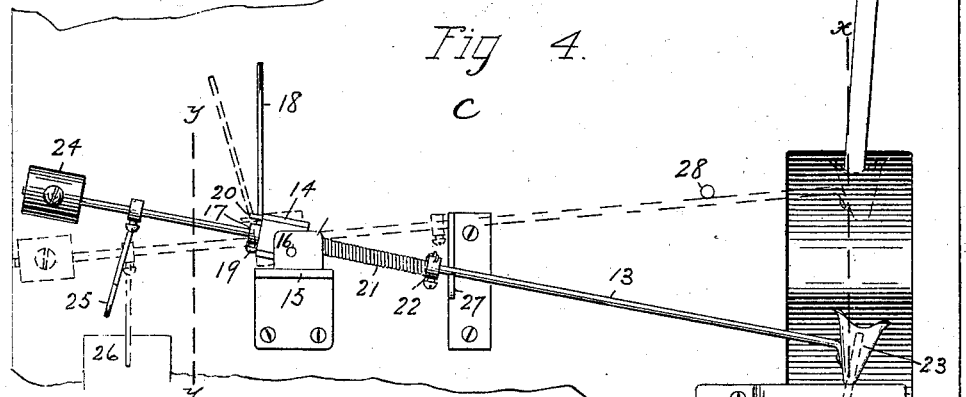
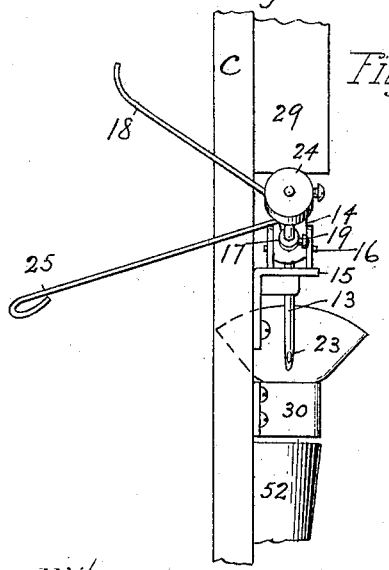
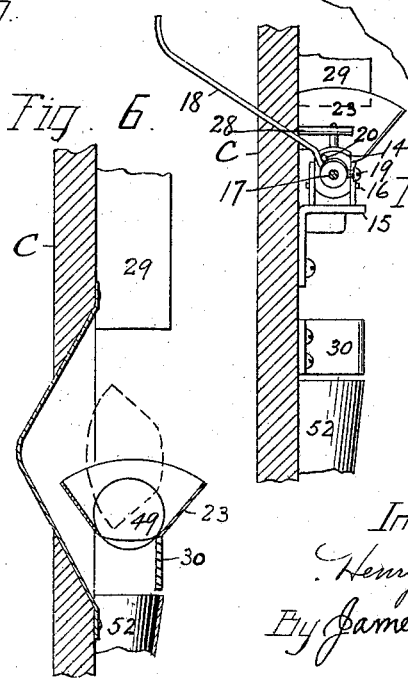
Witnesses  
Inventor  
Henry W. Porter  
By James Shepard  
Atty.

UNITED STATES PATENT OFFICE.

HENRY W. PORTER, OF FORESTVILLE, CONNECTICUT, ASSIGNOR OF TWO-THIRDS TO PETER T. FARRELL AND JOHN M. TOOHEY, OF NEW BRITAIN, CONNECTICUT.

COIN-CONTROLLED APPARATUS FOR EXHIBITING PICTURES.

SPECIFICATION forming part of Letters Patent No. 647,197, dated April 10, 1900.

Application filed January 24, 1900. Serial No. 2,620. (No model.)

*To all whom it may concern:*

Be it known that I, HENRY W. PORTER, a citizen of the United States, residing in Forestville, in the county of Hartford and State of Connecticut, have invented certain new and useful Improvements in Coin-Controlled Apparatus for Showing Pictures, of which the following is a specification.

My invention relates to coin-controlled machines for showing views; and the main object of my improvements is efficiency in operation, especially with reference to durability and certainty.

In the accompanying drawings, Figure 1 is a side elevation of my machine with the case removed. Fig. 2 is a rear elevation of the same. Fig. 3 is an enlarged sectional side elevation of the time-train and adjacent parts, one of the movement-plates being removed and some of the parts indicated in broken lines. Fig. 3½ is an enlarged sectional rear elevation on the line $z\ z$ of Fig. 3, showing the pin-wheels of the time-train. Fig. 4 is a front elevation of the coin-actuated lever and adjacent parts, the said lever being represented by full lines with its catcher down. Fig. 5 is a side elevation of the same. Fig. 6 is a vertical section on the line $x\ x$ of Fig. 4. Fig. 7 is a sectional side elevation on the line $y\ y$ of Fig. 4, the catcher of the coin-actuated lever being raised.

A designates the base, upon which I mount the two uprights B and front board C of the frame. In the lower part of the frame is the main shaft 8, carrying a head 9, that serves as a picture-carrier, a similar head 10 being mounted on the shaft 11 at the upper part of the frame, whereby a picture-holder 12 in the form of an endless-chain carrier may be mounted on and carried by the said heads.

D designates a time-train for controlling the movement of the picture-carrier, and E F two motor-trains for driving the heads and picture-carrier mounted thereon, the general construction of the same being old.

My improvements relate to the coin-actuated release and stop mechanism of the main shaft 8 under the action of the time-movement and the coin-controlled mechanism.

The coin-actuated lever 13 is mounted within a block 14 for turning axially, the said block being pivoted to the bracket 15 on the front board by means of the fulcrum pivot or pin 16. On one side of the block 14 there is a collar 17, carrying a tripping-arm 18, the same being made rigid on the coin-actuated lever as if in one piece therewith by means of the set-screw 19. A stop-pin 20 on the block 14 when engaged by the tripping-arm 18 limits the axial movement of the coin-actuated lever in one direction, as shown in Fig. 7. At the other side of the block 14 on the coin-actuated lever there is a spiral spring 21, one end of which is secured to the said block, while its other end is secured to the collar 22, that is made fast on the coin-actuated lever, as shown in Fig. 4, the said spring being wound so as to be under tension, with a tendency to normally hold the tripping-arm 18 against the stop-pin 20. The long end of the coin-actuated lever 13 is provided with a flaring catcher 23, and the opposite end is provided with a weight 24, preferably adjustable thereon, to normally hold the said lever in the position indicated by the broken lines in Fig. 4. This weighted end of the said lever is also provided with a holding-arm 25, made fast thereon, the same as if it were formed in one and the same piece therewith, the said holding-arm extending within the path of the flywheel or fan 26 of the time-train D for releasing and stopping the said train. I also prefer to provide the front board with stops 27 and 28 to limit the downward-and-upward movement of the longer end of the coin-actuated lever 13. When this end of the lever is up, the catcher 23 comes closely under the lower end of the coin-chute 29. The catcher 23 has a slot through its bottom so large as to let a cent pass through the same without operating the lever, but so small that a nickle cannot pass through the same. Underneath the lower end of the chute 29 there is a fixed guard or clearer 30, the upper edge of which is nearly in the plane of one end of the slot through the bottom of the catcher, so that when a coin is dropped through the chute into the catcher and depresses that end of the lever 13 the catcher, coin, and clearer have about the relative positions shown in full lines in Fig. 6.

Upon the endless-chain picture holder or carrier 12 there is a pin or projection 31, Figs. 1 and 2, for engaging the tripping-arm 18 of the coin-actuated lever. I also prefer to mount on the frame a spring 32 with a roller 33 for pressing forwardly the chain picture-carrier adjacent to the vision-opening 36 in the front board (the contour of which opening is shown by broken lines, Fig. 2) and another spring 34 and roller 35 to act in like manner at a point adjacent the tripping-arm 18 to prevent the flapping of the said carrier and to insure the engagement of the pin 31 with said arm 18.

The time-movement D consists, mainly, of two mainsprings, a train of wheels with fan or fly wheel 26, all of an ordinary construction not necessary to describe. I add to this train two pin-wheels 37 and 38, having each two pins 39. These wheels are of the same size with their teeth engaging, so as to move together, and the wheel 37 is mounted on the same shaft 50 that the wheel 51 of the time-train is mounted, so as to turn therewith. Upon the movement-frame between the pins of these wheels I mount a lever 40, and below this lever I mount the let-off and stop lever 41, having a stud 42. These two levers are connected by means of the link 43. While I do not consider it essential, I prefer to employ a spring 44 to assist the downward movement of these levers.

The main shaft 8 is provided at a point beneath the time-movement with a stop-disk 45, having stop-pins 46 and 47 in two different circles. The pins 47, which are on the inner circle, have one radial face and a clearing-face at an angle thereto. The pins 46 on the outer circle have also one radial face, with an inner clearing-face, the radial face on all of the pins being their front face. The direction of rotation of the stop-disk is indicated by the dart in Fig. 3.

The coin-actuated lever normally stands with its catcher up under the end of the coin-chute 29 and with the end of its holding-arm 25 in the path of the fly or fan 26 of the time-movement D. Upon depositing a proper coin—that is, a nickel 49—in the chute it is caught in the catcher 23 and depresses that end of the lever, thereby carrying the holding-arm 25 upwardly out of the path of the fly or fan 26, so that the time-train is released and put in motion under the influences of its spring. The lever 40 is acted on by the pins 39 of the wheels 37 and 38 after the manner of cams to positively operate the said lever up and down. It is moved upwardly by the pins on the wheel 37. There being two pins on each wheel, the said lever has two up-and-down movements for every revolution of the shaft 51. As shown in Fig. 3, the lower one of the pins 39 has just ceased to act in pushing the lever 40 downwardly and is about to rise therefrom, while the left-hand one of the pins 39 on the wheel 37 is about to engage the under side of the said lever to push it upwardly. As the said pin on the wheel 37 carries the said lever to its full height the next succeeding pin 39 on the wheel 38 acts to push the lever downwardly, and so on repeatedly, positively oscillating the said lever 40. The lever 41, being connected therewith, has a corresponding movement. It is shown in Fig. 3 with its stud 42 in engagement with the radial face of one of the inner circle of stop-pins 47. When the lever 41 has been raised sufficiently to carry the stud 42 wholly out of the path of the studs 47, the motor train or trains immediately start the main shaft 8 and stop-disk 45; but the lug 42 is then in the path of the outer circles of pins 46, so that the said shaft and disk can move only one-sixth of a revolution before they are stopped by the said pin. After a given time, determined by the speed of the movement-train, the lever 41 and stud 42 are lowered sufficiently to move the lug down below the path of the pins 46 and bring it again into the path of the pins 47, so that the stop-disk is again released and stopped, and so on repeatedly until the entire picture-holder 12 has passed the vision-opening. Just before the endless-chain picture-carrier completes its circuit the trip-pin 31 thereon engages the tripping-arm 18 of the coin-actuated lever and turns the said lever axially within the block 14 and against the force of the spring 21 for about one-quarter of a revolution. This will tip the catcher in the position indicated by broken lines in Fig. 6, and thereby the coin is discharged from the catcher into the lower chute 52, leading to any suitable receptacle for the coin. Immediately upon the discharge of the coin and the release of the tripping-arm 18 from the pin 31 as it passes down by the said arm the spring 21 returns the tripping-arm 18 to its normal position axially on the said coin-actuated lever, while the weight 24 tips the said lever on its fulcrum to its normal position with the catcher up under the end of the coin-chute and the holding-arm 25 again within the path of the fly or fan 26 of the time-train, so as to stop the same until another proper coin is put into the chute. When the catcher is in its lowermost position or weighted down with a coin, it is a distance below the lower end of the chute 29 considerably in excess of the diameter of the proper-sized coin, so that if other coins should be deposited in the chute when the catcher is down the catcher after being filled full of coins can freely overflow without any danger of clogging the machine. When the catcher is tipped to discharge the coin, its lower edge is brought in contact with the guard or clearer 30 and rolls up against the same to start the coin out of the slot.

I claim as my improvement—

1. The combination of the coin-actuated lever having a coin-catcher at one end with the pivoted block within which the said lever is journaled axially, stop devices to limit the axial movement of the said lever in one direction, and a spring acting to normally hold the said lever against the said stop devices, substantially as described.

2. The combination of the coin-actuated lever having a coin-catcher at one end with the pivoted block upon which the said lever is fulcrumed and within which the said lever may turn axially to discharge the coin from the said catcher, a tripping-arm on the said coin-actuated lever, and the picture-carrier having a pin or stud for engaging the said tripping-arm, substantially as described.

3. The combination of the coin-actuated lever having the coin-catcher at one end, means for mounting the said lever for tipping on its fulcrum and for turning axially to discharge the coin from the catcher, and the guard or clearer 30 just under the catcher when in its lowermost position and to one side thereof on that side toward which the coin moves in turning the catcher over, substantially as described.

4. The combination of the stop-disk having stop-pins arranged on two different circles with the stud 42 for being engaged by the said stop-pins, the coin-actuated lever, the time-train controlled by the said lever and mechanism driven by the said time-train for alternately moving the said stud 42 from out of the path of one circle of the stop-pins and into the path of the other circle of stop-pins, substantially as described.

5. The combination of the coin-actuated lever with the time-train D, controlled thereby, the pin-wheels 37 and 38 driven thereby, the lever 40 arranged between the pins of the said wheels for being moved back and forth, the stud 42 connected with and operated by the said lever 40, and the stop-disk having stop-pins in two different circles for alternately engaging the said stud 42 in its back- and-forth movement, substantially as described.

HENRY W. PORTER.

Witnesses:
PETER T. FARRELL,
JAMES SHEPARD.